(12) United States Patent
Venturelli et al.

(10) Patent No.: US 10,967,960 B2
(45) Date of Patent: Apr. 6, 2021

(54) GROUND MOVEMENT SYSTEM PLUGIN FOR VTOL UAVS

(71) Applicant: Archon Technologies S.R.L., Modena (IT)

(72) Inventors: Davide Venturelli, San Francisco, CA (US); Francesca Lorenzoni, Spilamberto Modena (IT); Roberto Navoni, Bergamo (IT)

(73) Assignee: Archon Technologies S.R.L., Modena (IT)

( * ) Notice: Subject to any disclaimer, the term of this patent is extended or adjusted under 35 U.S.C. 154(b) by 106 days.

(21) Appl. No.: 15/555,533

(22) PCT Filed: Apr. 6, 2016

(86) PCT No.: PCT/US2016/026152
§ 371 (c)(1),
(2) Date: Sep. 4, 2017

(87) PCT Pub. No.: WO2016/164416
PCT Pub. Date: Oct. 13, 2016

(65) Prior Publication Data
US 2018/0044000 A1  Feb. 15, 2018

Related U.S. Application Data

(60) Provisional application No. 62/143,605, filed on Apr. 6, 2015.

(51) Int. Cl.
*B64C 25/40* (2006.01)
*B64C 25/08* (2006.01)
(Continued)

(52) U.S. Cl.
CPC ............ *B64C 25/405* (2013.01); *B60L 53/12* (2019.02); *B60L 53/30* (2019.02); *B60L 53/68* (2019.02);
(Continued)

(58) Field of Classification Search
CPC ....... B64C 25/08; B64C 25/405; B64C 37/00; B60F 5/02; B64F 1/007; B64F 1/10; B64F 1/228
See application file for complete search history.

(56) References Cited

U.S. PATENT DOCUMENTS 3,210,029 A * 10/1965 Brusch ...................... B64F 1/10
                                                  244/114 R
3,605,935 A *  9/1971 Gilbert ....................... B60F 5/02
                                                   180/89.1
(Continued)

FOREIGN PATENT DOCUMENTS

DE    102007003458 A1    7/2008
KR       101566341 B1   11/2015
(Continued)

OTHER PUBLICATIONS

Providential Systems, Groundrig UGV Long Range Gimbal Buggy (Feb. 17, 2015) https://web.archive.org/web/20150404001720/http://www.providentialsystems.com/2015/02/17/groundrig-ugv-long-range-gimbal-buggy.
(Continued)

*Primary Examiner* — Joseph W Sanderson
(74) *Attorney, Agent, or Firm* — King & Wood Mallesons LLP (57) ABSTRACT

A ground movement plug-in (GMP) apparatus for providing ground propulsion to an unmanned aircraft vehicle (UAV). The GMP apparatus includes a frame configured to mechanically couple with the UAV, a plurality of wheels, at least one
(Continued)

of which is actuatable by a motor, and a controller operably coupled to the motor to control propulsion of the GMP apparatus.

21 Claims, 10 Drawing Sheets

(51) Int. Cl.
    *B64C 25/34*     (2006.01)
    *B64C 37/00*     (2006.01)
    *B64C 39/02*     (2006.01)
    *B60L 53/12*     (2019.01)
    *B60L 53/30*     (2019.01)
    *B60L 53/68*     (2019.01)

(52) U.S. Cl.
    CPC .............. *B64C 25/08* (2013.01); *B64C 25/34* (2013.01); *B64C 37/00* (2013.01); *B64C 39/024* (2013.01); *B60L 2200/10* (2013.01); *B64C 2201/042* (2013.01); *B64C 2201/066* (2013.01); *B64C 2201/127* (2013.01); *Y02T 50/80* (2013.01)

(56) References Cited

U.S. PATENT DOCUMENTS

| | | | |
|---|---|---|---|
| 3,761,040 A * | 9/1973 | Cummins | B60F 5/02 244/2 |
| 4,944,321 A | 7/1990 | Moyet-Ortiz | |
| 7,053,578 B2 | 5/2006 | Diehl et al. | |
| 8,205,820 B2 * | 6/2012 | Goossen | B64C 37/00 244/110 E |
| 8,245,980 B2 * | 8/2012 | Perry | B64F 1/22 244/189 |
| 8,511,606 B1 | 8/2013 | Lutke et al. | |
| 8,781,727 B1 | 7/2014 | Bonawitz et al. | |
| 9,056,676 B1 * | 6/2015 | Wang | B64F 1/00 |
| 9,056,686 B2 * | 6/2015 | Chan | B64F 1/10 |
| 9,227,737 B2 * | 1/2016 | Chan | B64F 1/228 |
| 9,864,372 B2 | 1/2018 | Chen et al. | |
| 9,873,408 B2 * | 1/2018 | Capizzo | B60L 53/60 |
| 10,040,576 B1 * | 8/2018 | Rosenberg | B64F 1/228 |
| 10,137,983 B2 | 11/2018 | Horn | |
| 10,303,167 B2 | 5/2019 | Chen et al. | |
| 2004/0167682 A1 | 8/2004 | Beck et al. | |
| 2005/0231157 A1 | 10/2005 | Sanders, Jr. et al. | |
| 2006/0049304 A1 | 3/2006 | Sanders, Jr. et al. | |
| 2008/0083851 A1 * | 4/2008 | Perry | B64F 1/22 244/189 |
| 2008/0283661 A1 * | 11/2008 | Henley | B60B 19/003 244/114 R |
| 2009/0314883 A1 | 12/2009 | Arlton et al. | |
| 2010/0102167 A1 * | 4/2010 | Dital | B64C 25/08 244/110 E |
| 2010/0193626 A1 | 8/2010 | Goossen et al. | |
| 2011/0068224 A1 | 3/2011 | Kang et al. | |
| 2012/0166024 A1 | 6/2012 | Phillips et al. | |
| 2012/0303179 A1 | 11/2012 | Schempf | |
| 2013/0214089 A1 | 8/2013 | Cox et al. | |
| 2013/0270394 A1 | 10/2013 | Downs | |
| 2014/0048342 A1 * | 2/2014 | Chan | B64F 1/10 180/6.7 |
| 2014/0061376 A1 * | 3/2014 | Fisher | B64D 27/24 244/62 |
| 2014/0024999 A1 | 7/2014 | Levien et al. | |
| 2014/0209733 A1 * | 7/2014 | Chan | B64F 1/227 244/50 |
| 2014/0231590 A1 | 8/2014 | Trowbridge et al. | |
| 2014/0249693 A1 | 9/2014 | Stark et al. | |
| 2015/0076285 A1 | 3/2015 | Chavez, Jr. | |
| 2016/0122038 A1 | 5/2016 | Fleischman et al. | |
| 2016/0161258 A1 | 6/2016 | Magson | |
| 2016/0284221 A1 | 9/2016 | Hinkle et al. | |
| 2017/0101173 A1 * | 4/2017 | Morris | F16H 1/24 |
| 2017/0129603 A1 | 5/2017 | Raptopoulos et al. | |
| 2018/0029723 A1 | 2/2018 | Krauss et al. | |
| 2018/0065759 A1 | 3/2018 | Michalski | |
| 2018/0290743 A1 | 10/2018 | Vorsin | |
| 2019/0002128 A1 | 1/2019 | Raz et al. | |
| 2019/0127085 A1 | 5/2019 | Krauss et al. | |
| 2019/0202578 A1 | 7/2019 | Fox et al. | |
| 2019/0227572 A1 | 7/2019 | Blonder et al. | |
| 2019/0265694 A1 | 8/2019 | Chen et al. | |

FOREIGN PATENT DOCUMENTS

| | | |
|---|---|---|
| WO | 2008147484 A2 | 12/2008 |
| WO | 2011149544 A1 | 12/2011 |
| WO | WO 2011149544 | 12/2011 |
| WO | 2012117280 A1 | 9/2012 |

OTHER PUBLICATIONS

Lavars, New control method enables drones to land autonomously on moving vehicles (Aug. 21, 2014) http://www.gizmag.com/control-method-drones-autonomous-docking-moving-vehicles/33448/.
Supplemental European Search Report and Examination, Appl. No. EP 16 77 7171.6 (dated Oct. 23, 2018).

* cited by examiner

GROUND MOVEMENT SYSTEM PLUGIN FOR VTOL UAVS

CROSS-REFERENCE TO RELATED APPLICATIONS

This application claims benefit of the earlier filing date of U.S. Provisional Patent Application No. 62/143,605, titled "Motorized Ground Propulsion System Plugin for Vertical Take Off and Landing Unmanned Aerial Vehicles," filed on Apr. 6, 2015, the entire contents of which are hereby incorporated by reference in their entirety.

All patents, patent applications and publications cited herein are hereby incorporated by reference in their entirety in order to more fully describe the state of the art as known to those skilled therein as of the date of the invention described herein.

FIELD OF THE INVENTION

One or more embodiments of the present disclosure generally relate to autonomous landing operations of an unmanned aerial vehicle (UAV) or "drone." More specifically, one or more embodiments relate to ground propulsion systems for UAVs.

BACKGROUND

Small helicopters and multi-copters, including hybrid airplanes with vertical take-off and landing (VTOL) vehicles, are a fast expanding technology in the civil market. They are increasingly used in operations that expose people to risk (e.g., in chemical plants, nuclear plants, etc.), activities carried out in highly inaccessible areas (e.g., viaducts, skyscrapers, furnaces, offshore rescue, etc.), and monitoring procedures requiring a high degree of precision (e.g., inspection of cracks in dams/bridges, airplane maintenance, oil tank keels, etc.).

In addition to industrial and governmental critical infrastructure applications, potential applications of VTOL vehicle technology range from industrial (e.g., in plants, machineries, etc.) to environmental safeguarding (e.g., volcanoes, parks, coasts, etc.), including the protection of sensitive areas (e.g., archaeological sites, territorial borders, etc.). However, most vehicles available on the market have a limited range (e.g., 15 to 25 minutes of flight time, depending on the typology of their mission), which limits the possibility of a wider deployment of this technology.

SUMMARY OF THE INVENTION

Embodiments set forth herein include a pluggable hardware extension, or ground movement plug-in (GMP), that is attachable to a vertical take-off and landing (VTOL) unmanned aerial vehicle (UAV), such as a multicopter. The GMP (or "GMP vehicle") can be configured to attach to and/or move the UAV, for example on the ground, with or without directional constraints. In addition or alternatively, the GMP can be configured to physically support a smooth landing of the UAV. The GMP can reposition an attached UAV to a predetermined position that is accessible, for example, via ground movement. The predetermined position can be a compartment of a docking station, for example, for recharging, package or "payload" delivery, data downloading, etc.

In some embodiments, a GMP includes: a frame configured to mechanically couple with the UAV, a plurality of wheels, at least one wheel of the plurality of wheels actuatable by a motor; and a controller operably coupled to the motor to control propulsion of the apparatus. The frame can include an adapter to mechanically and/or electrically couple to the UAV and/or to any one of a plurality of UAV types/sizes.

In some embodiments, a UAV is able to reach a specific location, for example a docking station and/or charger, regardless of imprecise landing, adverse weather conditions or other mitigating factors, such as low visibility. In other words, once a UAV is attached to a GMP, it can acquire the properties and capabilities of a rover robot.

In some embodiments, an apparatus for providing ground propulsion to a UAV includes a frame configured to mechanically couple with the UAV, a plurality of wheels, at least one of which is actuatable by a motor, and a controller operably coupled to the motor to control propulsion of the apparatus. The controller can be adapted to interface, during use, with at least one of an electronic board of the UAV and a remote control unit. The frame of the apparatus can be configured to mechanically and electrically couple to a computer. The apparatus can also include a charger, such as a wireless charger, configured to connect to and recharge a battery of the UAV during use. The apparatus can be electrically coupled to the UAV, for example, when at least a portion of the UAV is received in or on the apparatus (e.g., after the UAV has landed on the apparatus).

In some embodiments, the apparatus receives electrical power from a power supply of the UAV instead of, or in addition to, a local or onboard power supply.

In some embodiments, the apparatus includes a battery.

In some embodiments, the apparatus includes at least one of: a GPS receiver, an antenna, and a gimbal.

In some embodiments, the apparatus includes a computer operably coupled to the controller, the computer including a processor and a non-transitory memory storing processor-issuable instructions to drive the motor. The computer can include a camera configured to capture at least one of video and still images and, optionally, an image processor to process the at least one of video and still images. The computer can also include an antenna configured to communicate with a remote terminal, such as the UAV or a docking station.

In some embodiments, the apparatus includes a sensor to receive position data, the GPS receiver operably coupled to the controller, the non-transitory memory storing processor-issuable instructions to drive the motor to reposition the vehicle based on the position data. The sensor can include one or more of: a GPS receiver, an accelerometer, a gyroscope, LIDAR, or a visual recognition system. Position data collected by the sensor during use can include position data of the GMP vehicle and/or position data of a UAV.

In some embodiments, a system includes a UAV and an apparatus for providing ground propulsion to the UAV. The apparatus includes a frame configured to mechanically couple with the UAV, a plurality of wheels, at least one of which is actuatable by a motor, and a controller operably coupled to the motor to control propulsion of the apparatus.

In some embodiments, a method for providing ground propulsion to a UAV includes coupling the UAV to a propulsion apparatus and controlling the propulsion apparatus using the controller to propel the UAV. The propulsion apparatus can include a frame configured to mechanically couple with the UAV, a plurality of wheels, at least one wheel of which is actuatable by a motor, and a controller operably coupled to the motor to control propulsion of the apparatus, and In some embodiments, an apparatus for providing ground propulsion to an unmanned aircraft vehicle (UAV) includes: a propulsion device including at least one of a continuous track and one or more mechanical leg(s) for propulsion; and a frame configured to mechanically couple with the UAV. The propulsion device can be configured to actuate, during use, in response to an externally applied force such as wind or a motor of the UAV. In some such embodiments, the apparatus includes the UAV.

In some embodiments, a system includes a UAV and an apparatus for providing ground propulsion to the UAV. The apparatus includes a propulsion device including at least one of a continuous track and a mechanical leg; and a frame configured to mechanically couple with the UAV.

In some embodiments, the apparatus for providing ground propulsion to the UAV is a GMP.

The GMP can be configured such that it is removably attachable to the UAV, or it can be configured such that it becomes permanently attached to the UAV once engaged therewith. The GMP can be designed to be attached on a top, bottom or side surface of the UAV, and can include an attachment comprising one or more of: clamps, screws, tapes, glue interfaces, straps, elastic material, ropes, wires, magnetostatic systems, electromagnetic systems, and/or any other system by which the GMP can be mechanically and/or electrically coupled to the UAV. The attachment procedure can include skilled integration work, or can be performed quickly (e.g., in a matter of seconds) without modifying the UAV airframe. The UAV can comprise a multicopter, a helicopter, or any unmanned aircraft of any size which is capable of VTOL.

In some embodiments, the GMP system can be installed on a UAV via a mechanical joint. Alternatively or in addition, the GMP can be glued or temporarily fixed through strings, tape or any other support that would fix the GMP to the UAV. Various methods may be used to attach the structure of the GMP to the physical skid of the multi-copter.

In some embodiments, the GMP has a wheeled platform or frame (also referred to herein, collectively, as "propulsion mechanics"). Although shown and described herein to comprise wheels, any other kind of ground movement system known in the art, such as a continuous tank track, casters, etc., is also contemplated. The GMP is configured to perform or facilitate safe landing of a UAV. This can include shock absorber or damper systems, such as springs, to smooth/soften the impact with the ground. These GMP is configured to cross rough terrain and/or climb slopes.

In some embodiments, the GMP is operable completely independently from the UAV, and has an interface that is adaptable to different types and sizes of UAV. The GMP can comprise a ground/terrestrial robot capable of mobile transport, and configured to receive at least a portion of a UAV thereon or therein via the interface. The interface can have a form factor that is complementary to the at least a portion of the UAV. In some embodiments, the GMP is configured such that it does not move (i.e., remains stationary) if it is not attached to a UAV.

In some embodiments, the GMP includes a set of wheels that are configured for terrain movement. The wheels can be unidirectional, bidirectional, or multidirectional (e.g., spherical).

In some embodiments, the GMP includes a set of omni wheels that can be driven with full force, and that slide laterally with great ease.

In some embodiments, the GMP is configured to serve as an autonomous motor system for a VTOL UAV, and can be powered by a battery of the UAV and/or by an independent onboard battery.

In some embodiments, the GMP is not motorized and is instead configured to slide and shift on the ground in response to momentum imparted thereto by an external applied force such, as wind or the UAV propellers, or the engine(s) moving the UAV propellers.

In some embodiments, a GMP transportation system includes one or more features that facilitate movement (e.g., floating hull, propellers, skids, tracks, etc.) that can propel the UAV on any non-vertical surface (generally referred to herein as "ground"). Non-vertical surfaces can include the surface of a fluid, and/or a viscous, amorphous, malleable, frictionless and/or non-gaseous material such as water, sand, snow, or ice.

If motorized, the GMP can have one or multiple electronic boards, or "controllers," for example to control the propulsion mechanics and/or communicate with a flight-control system of the UAV. In some embodiments, the GMP is fully autonomous in that it does not communicate with the flight-control system of the UAV or with any other electronic board of the UAV. In the description that follows, the terms "electronic board" and "controller" are used interchangeably, and generally include electronic circuits without being limited to printed circuit boards and the like.

In some embodiments, the GMP is configured to connect to a flight-control system board, or other electronic board, present on an attached UAV. For example, the attached UAV can have an interface (e.g., a receptacle or plug) on its flight-control board to connect to peripheral devices, and the GMP can have a complementary receptacle or plug. The connection between the GMP and the electronic board of the UAV can be used by the GMP and/or the UAV to transfer data such as commands for the movement of the GMP. The connection between the GMP and the electronic board of the UAV can be a direct connection to one or more motors of the GMP, or to the electronic board on the GMP. In some such embodiments, the GMP can be programmed and/or controlled by a software library stored in the GMP or the UAV. The software library can be customized, or commercially obtained (e.g., a software library released by the vendor of the flight-control board).

The GMP controller can include one or more integrated electronic components and/or interfaces to external devices, for example to support a long-range remote communication link. The supported communication link can be either analog or digital, and configured to transmit data via radio waves or wireless communications protocols, e.g., Wi-Fi and WLAN protocols, GSM or 3G/4G/LTE cellular transmission, IR/laser transmission systems, or other available communication medium allowing long-distance data exchange.

The communication link can be established between the controller and any other kind of transmitter/receiver that is configured to support the connection, such as a remote control, a network card of a computer, a dongle, or an antenna system of any size. In some embodiments, the communication link is used to control propulsion of the GMP as an independent device, and/or to operate the other components present in some embodiments of the GMP, such as a charger. In some embodiments, regardless of whether the GMP includes an independent communication mechanism, the GMP can be operated through a connection with an electronic board of the attached UAV.

In some embodiments, the GMP controller is configured to interface with additional components such as, but not limited to, GPS receivers, sensors, a gimbal system, a camera, a smartphone, a parachute activator, and computer processors. The GMP controller can include a high-level embedded operating system (OS), such as Linux or Android, or a full OS, such as embedded operating systems like: Nuttx, FreeRtos, SafeRtos, VXWorx, Windriver, Robot Operating System (ROS) or a complete Linux distribution, other UNIX/POSIX OS such as MacOS, or Microsoft Windows. For embodiments in which the GMP includes a camera, the camera can be configured to collect still images and/or video, and the GMP can include a transmitter to stream videos or upload data via the communication link.

In some embodiments, the GMP includes a charger compartment, ("recharge unit") for example disposed adjacent to or within the ground movement elements. The charger can host technology that works in conjunction to a recharging station.

Examples of chargers are: a wireless charger with receiving circuitry that is configured to receive energy from a transmitting coil through coupled inductive or capacitive electromagnetic interaction (e.g., inductive charging); an electric conduction system including a cathode and an anode that are configured/positioned to contact metallic pads of corresponding polarity; a "hot swap" battery substitution system in which the battery of the attached UAV is electro-mechanically substituted with a battery provided by the GMP or docking station, for example within the charger compartment; a fuel-cell system that supplies power via loading of chemical fuel in encapsulated or solid, liquid, gaseous form.

The charger compartment, or recharge unit, can also be used to physically host the application board of the GMP, as well as any other additional electronics present in advanced embodiments of the GMP, such as sensors or companion computers.

The GMP controller can be electronically integrated with the charger and/or additional electronic components. In other words, the charger can be used to supply power to any other electronics in the GMP and/or the UAV. For example, in some embodiments, package release mechanics onboard the GMP are only powered when the UAV is docked.

In some embodiments, the GMP includes onboard electronics, and the GMP is configured to interface/connect with a power source, for example to power the propulsion of the GMP. In some embodiments, the power source is the same power source powering the UAV, for example a battery onboard the UAV. The connection to the power source can be direct or via the charger.

In some embodiments, the GMP can host a module that allows the GMP to interact remotely with a nearby recharging station. This interaction is meant to assist the docking procedure via the movements allowed by the GMP. The module could be, for instance, a dedicated electromagnetic waves transmission module, a visual recognition system, a localization and alignment method using lasers, other forms of light, sound waves such as ultrasounds, or it could use physical hardware extensions such as light tethers or elongated artificial whiskers.

In some embodiments, the operation of the GMP through the external link can be assisted by a human pilot which controls the movement of the GMP and of the attached UAV manually. For example, the GMP could be directed into positioning in the appropriate area of a docking station in First Person View pilot mode, by means of real-time video streaming from the cameras installed on the UAV or on the GMP.

BRIEF DESCRIPTION OF THE DRAWINGS

In order to illustrate the way in which the above mentioned advantages and features of the embodiments can be obtained, a brief description of the components is provided in the appended drawings. It needs to be underlined that the figures are not drawn to scale, and similar elements, in terms of function or shape, are indicated through reference numerals; the drawings should be considered as illustrations of typical embodiments without limiting of the scope.

DETAILED DESCRIPTION

Current technological developments in the field of vertical take-off and landing (VTOL) unmanned aerial vehicles (UAVs) include ground stations that supply power to the UAVs and/or that serve as docking areas. However, UAVs do not always effectively reach these stations when landing operations are completed—a task made particularly difficult in adverse weather conditions, when the process can be disturbed by external factors, such as rain or wind, or impaired by low visibility.

Automatic landing is a difficult task which must be carried out with great care in order to avoid damage to the UAV. Various types of automatic landing systems have been proposed. However, none of the previously proposed systems of this type provides an adequate and sufficiently reliable method by which a safe, autonomous landing can be achieved during adverse weather conditions. Moreover, there is a need for a system that, in addition to the capability of landing a VTOL UAV safely, can direct the UAV to a target location, once it has landed, by using an automatic repositioning system. Previously, multi-copters with fixed wheels have been proposed and are currently in use. The current commercialized systems have wheels that are directly integrated in the vehicle airframe, and not motorized. For example, current systems exploit the UAV propellers' air displacement in order to provide movement on the ground, and are mostly directed at products for recreational use. Ground propulsion for non-flying robots comes in many forms, and a variety of transport methods have been proposed for ground mobility of electromechanical systems, such as rows of wheels, continuous tank tracks, and artificial articulating legs. Other technologies include UAV plug-ins that differ from those described herein. Examples are gimbals for cameras or any other removable support for data acquisition sensors or other hardware extensions enabling, for example, indoor navigation through on-board systems that interface with additional hardware positioned on the ground.

Still other technologies include flight control and movement control electronic boards that allow the programmability of flights through application program interfaces (API), released by a vendor within a software development kit (SDK). Such APIs can be wrapping standard proprietary or open source communication protocols, and used to define the flight instructions (such as Mavlink), or could be based on an entirely new programming language for controlling a specific UAV/robot.

Other related technology includes landing platforms for VTOL UAVs, for example recharging/docking stations, whose working principle is based on the exact positioning of the UAV and its vertical landing on the required spot (i.e., precision landing).

Other related technology also includes ground robot docking stations, accessible to the robots through mechanical or electromagnetic guides, that align the UAV with the robot and allow it to interface with the docking system. These known systems and methods to assist the docking of ground robots have never been applied to UAVs, as they are not traditionally capable of moving on the ground.

The present disclosure is directed to terrestrial ground movement plug-in (GMP) vehicles that are designed to attach to a UAV, either prior to/during flight or after landing, and to provide functionality for terrestrial transport of the UAV (e.g., so that the UAV effectively becomes a ground robot). GMP vehicles described herein facilitate landing and/or movement of UAVs, and have sufficient space to accommodate sensors and/or other hardware, such as a recharger interface. GMP vehicle systems described herein allow UAVs to fully exploit the plethora of methods of movement and interaction with docking stations that are already available for ground robots, as well as enabling the execution of new movements and interactions.

Embodiments of the present disclosure are described hereinafter with reference to the accompanying drawings, in which one or more, but not all the embodiments of the invention are shown in each figure. Indeed, the present invention can be embodied in many different forms and should not be considered as being limited to the embodiments set forth herein. In the drawings, thick arrows indicate a connection between components, and dashed arrows indicate an optional connection between components.

In some of the descriptions set forth below, a VR Spark quadcopter or variations of a VR Mapper quadcopter is used as an example, however other types of UAV can be used.

Figure 1:
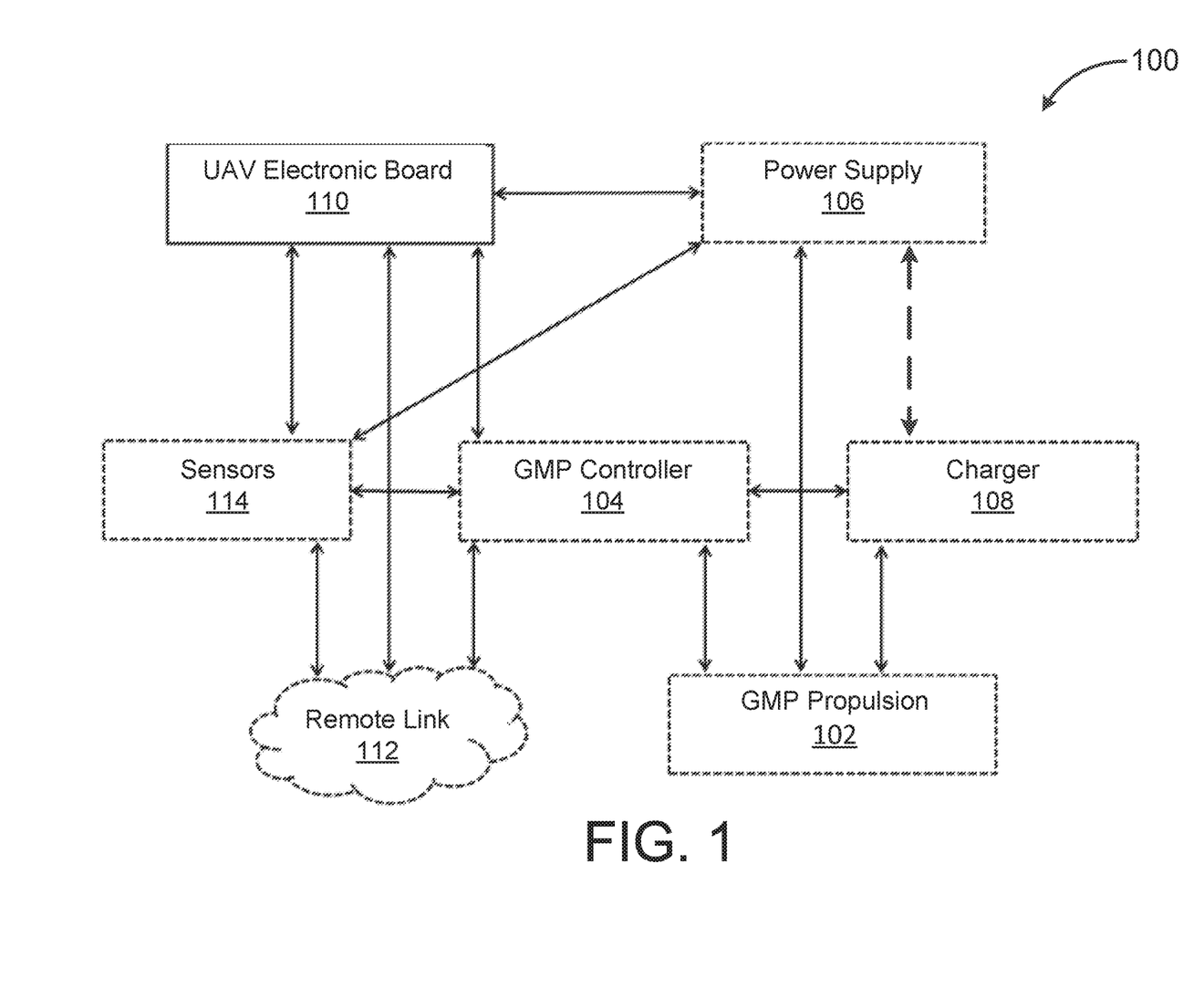
FIG. 1 is a block diagram representing the interaction of components in GMP systems, according to some embodiments.

FIG. 1 is a block diagram representing the interaction of components in some embodiments of GMP systems 100. Each arrow represents a possible connection (e.g., a physical connection and/or a connection that is configured for data transmission). Dashed squares represent optional components of the envisioned system. As shown in FIG. 1, the GMP system 100 includes GMP propulsion mechanics 102 operably coupled to a GMP controller 104, and a power supply 106 (e.g., one or more batteries). The power supply 106 can be disposed within the GMP, within the UAV, or both. The power supply 106 can be operably coupled to an optional charger 108, which may be disposed on board the GMP vehicle itself, or external to the GMP vehicle, with the GMP vehicle being configured to make an electrical connection therewith. The GMP controller 104 is optionally coupled to a UAV electronic board 110 (e.g., a flight control system) of a UAV when the UAV is at least partially disposed on or in the GMP), for example to receive data and/or power from the UAV. The UAV electronic board 110 and/or the GMP controller 104 can be operably coupled to one or more sensors 114 onboard the GMP, the UAV, or both. The UAV (e.g., via the UAV electronic board 110), sensors 114, and/or the GMP controller 104 can be in communication with one or more remote terminals via an optional remote link, for example to send or receive data.

Figure 2:
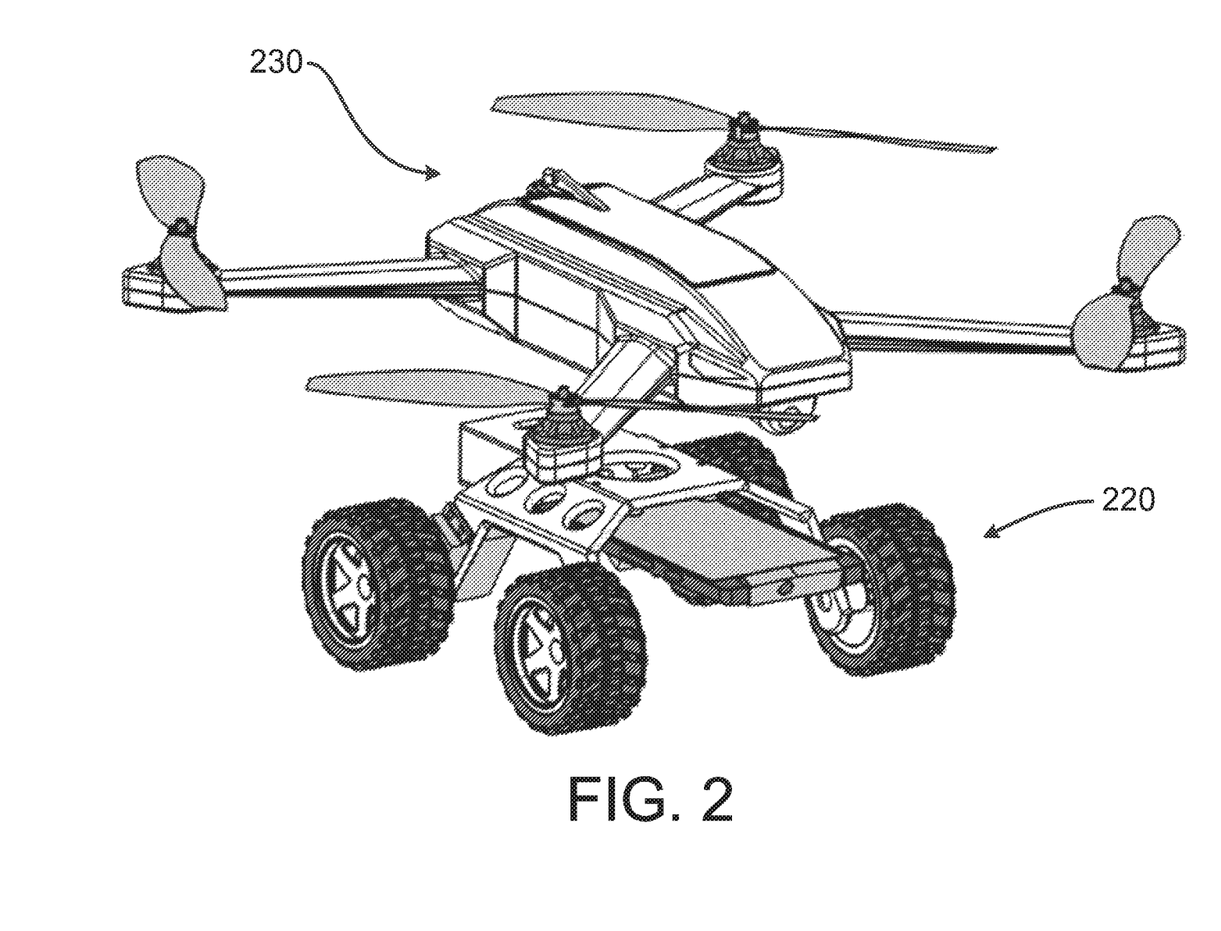
FIG. 2 is a rendering of a GMP vehicle attached to a UAV, according to an embodiment.

FIG. 2 is a rendering of a UAV 230 attached to a GMP vehicle 220, according to an embodiment. In this embodiment, the position of the center of gravity of the UAV, when attached, mounted, or assembled to the GMP vehicle, ensures stability during maneuvers on the ground and/or during adverse weather conditions.

Figure 3:
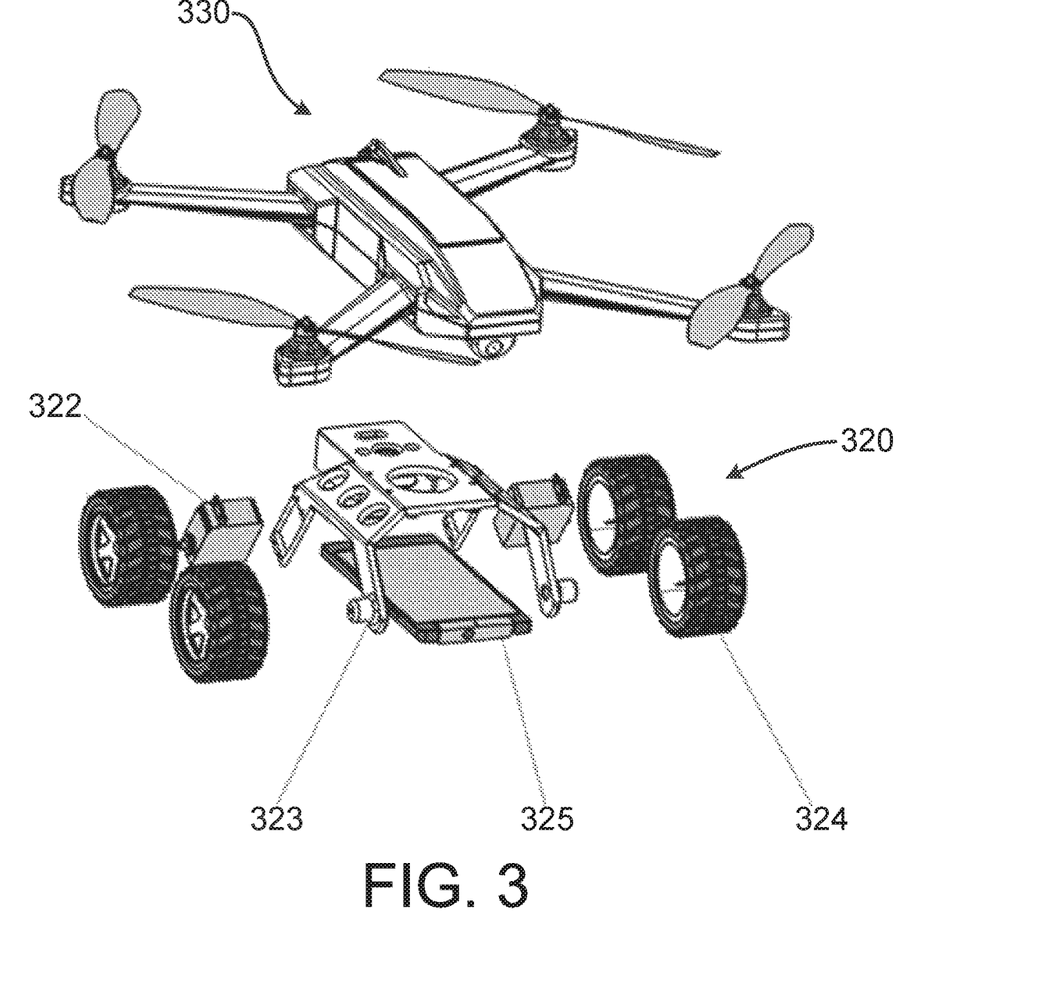
FIG. 3 is a rendering of a UAV hovering above a GMP vehicle, according to an embodiment.

FIG. 3 is a rendering of a UAV 330 hovering above a GMP vehicle 320, according to an embodiment of the invention. A plugin skeleton or "frame" 323 is the central component of the GMP vehicle, and it connects a ground propulsion motor 322 and the wheels 324 together, in addition to acting as the interface/adapter onto which the UAV 330 can land/attach. In the embodiment of FIG. 3, the GMP 320 is also connected to a companion computer 325 having functions such as: image and video capture, a central processing unit (CPU) for image processing, modules for communications via radio/WiFi/4G, and wireless recharging.

Figure 4:
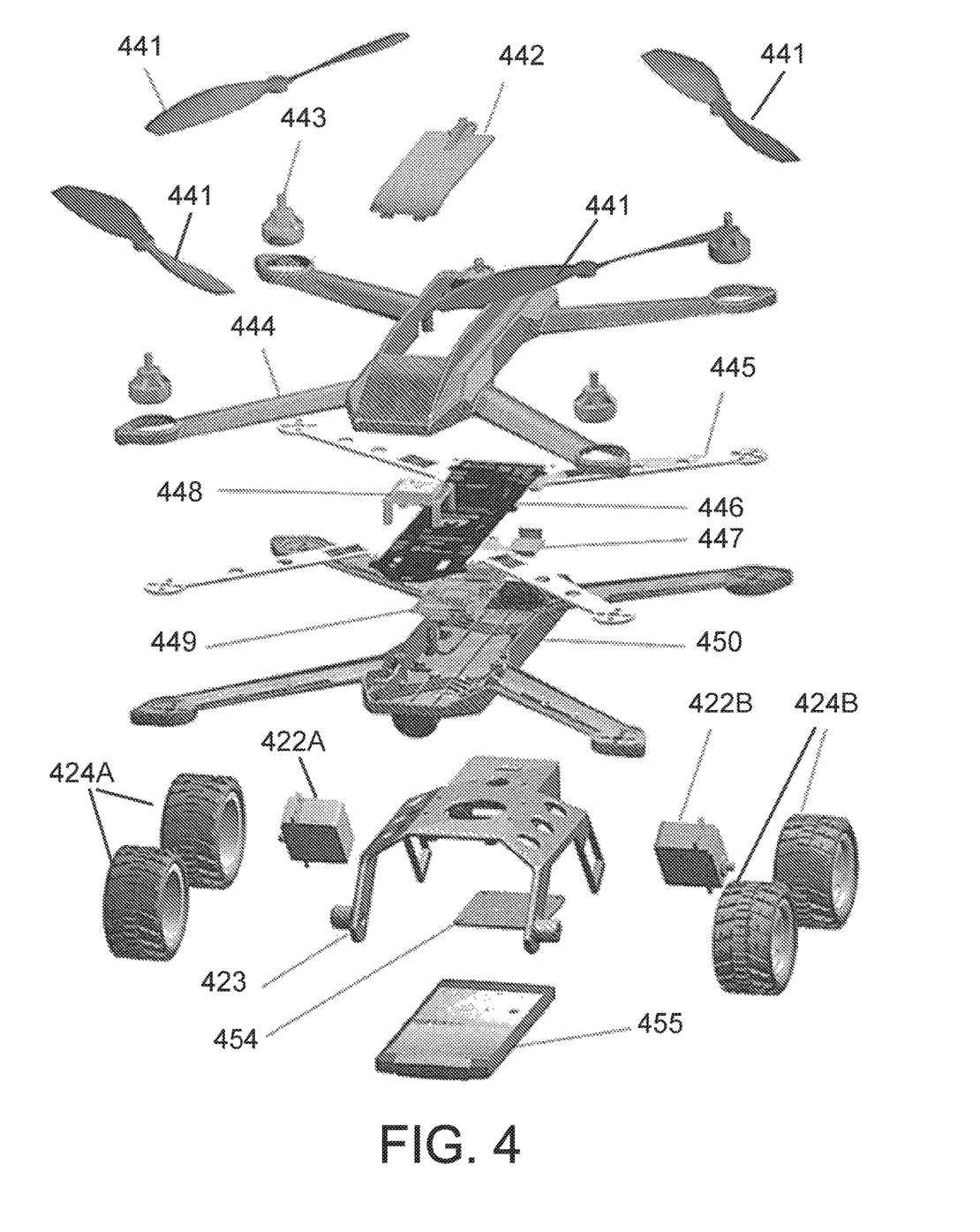
FIG. 4 is an exploded rendering of a UAV and GMP vehicle, according to an embodiment.

FIG. 4 is an exploded rendering of a UAV and GMP vehicle, showing internal components thereof, according to an embodiment of the invention. The UAV includes four propeller blades 441 driven by a motor for propeller blades 443 and connected to a first portion 444 of a UAV shell, which includes a removable battery compartment cover 442. The UAV includes an inner frame 445 having an integrated electronic speed controller, a radio telemetry module 447, a GPS unit 448, a flight-control system board 449, and a central printed circuit board 446 connecting different electronic components together (e.g., 447, 448 and 449). Another portion, 450, of the UAV shell is connectable directly to the plugin skeleton 423 of the GMP vehicle. The plugin skeleton 423 connects the ground propulsion motors 422A and 422B with corresponding pairs of wheels 424A and 424B (respectively), a companion computer 455 (e.g., a smartphone) and a GMP-dedicated control board 454. The UAV shell can be defined by components 442, 444, 445 and 450 (the battery compartment cover, first shell portion, inner frame, and second shell portion, respectively).

Figure 5:
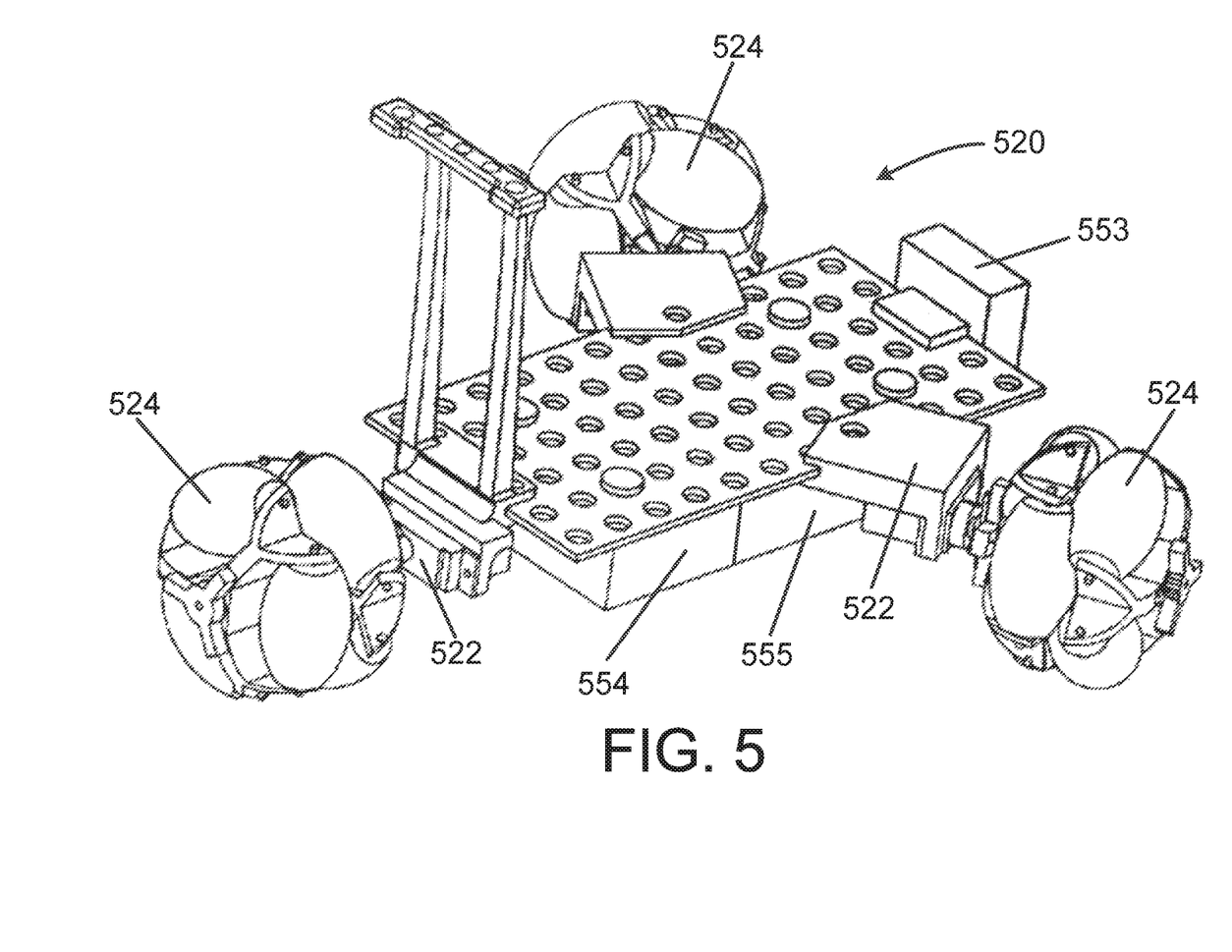
FIG. 5 is a rendering of a perspective view of a GMP vehicle, according to some embodiments.
Figure 6A:
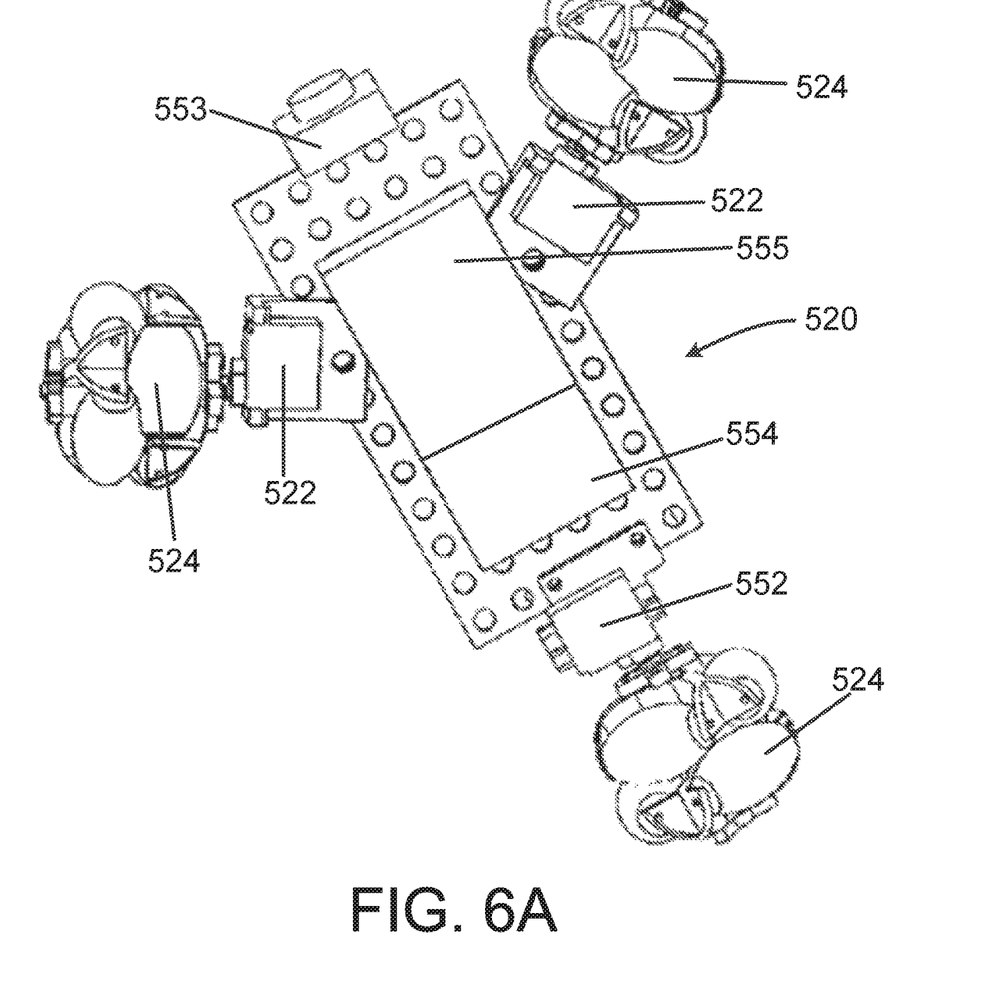
FIG. 6A is a rendering of a top view of the GMP vehicle of FIG. 5.

FIG. 5 is a rendering of a perspective view of a GMP vehicle, according to some embodiments. The GMP vehicle 520 includes three multidirectional wheels 524 each attached to the frame of the GMP vehicle 520 via a corresponding servo 522. The GMP vehicle 520 also includes a companion computer 554 (e.g., a mobile device such as a cell phone) mounted to its underside. The space under the frame of the GMP can also be used as compartment for a charging unit 555 (e.g., a contact or contactless charging system/unit). FIG. 6A is a rendering of a top view of the GMP vehicle 520 of FIG. 5.

Figure 6B:
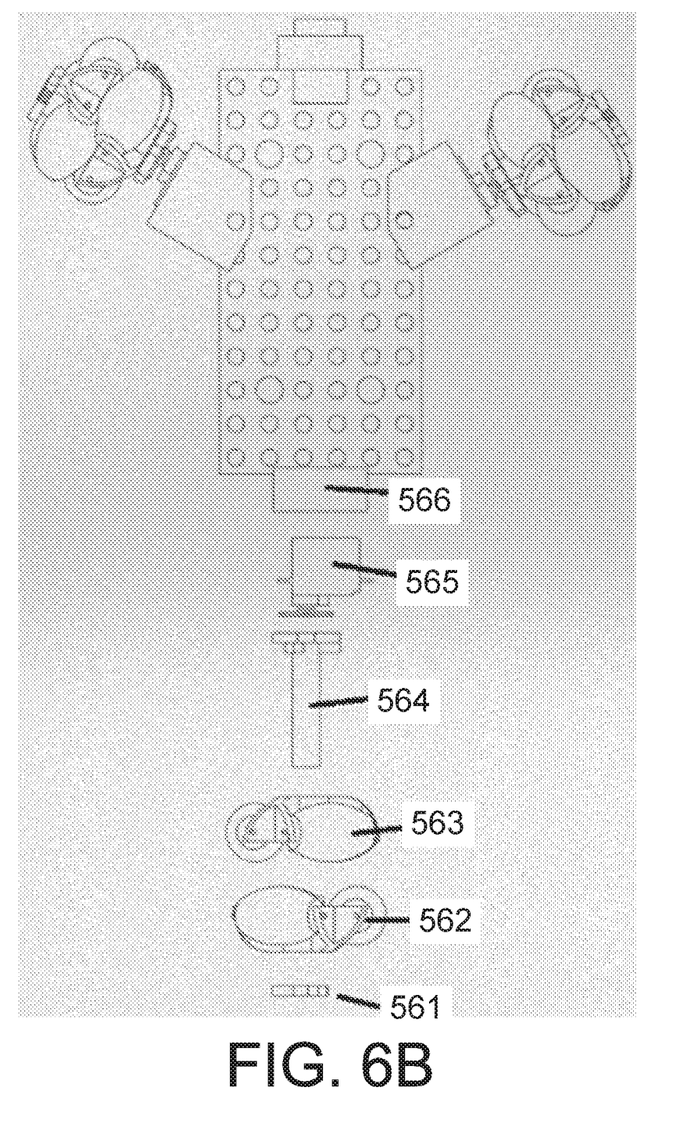
FIG. 6B is a partially exploded rendering of a top view of the GMP vehicle of FIG. 5.

FIG. 6B is a partially exploded rendering of a top view of the GMP vehicle of FIG. 5. When assembled, wheels 562 and 563 are secured to a pivot 564 by a clamping block 561. The pivot 564 is mounted to a servo 565, which is attached to a mounting block 566.

Figure 7:
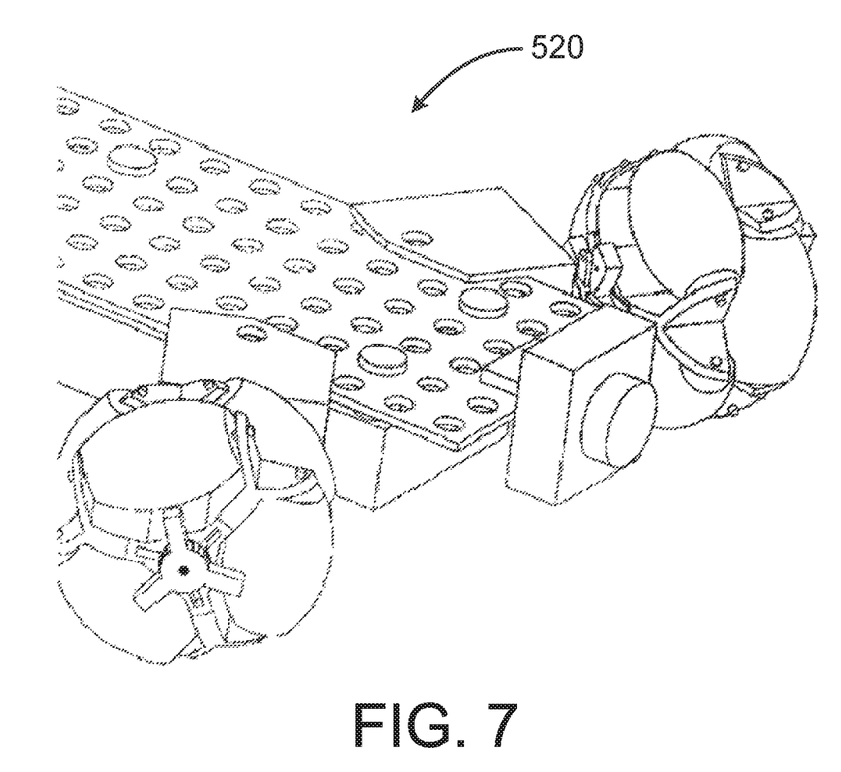
FIG. 7 is a rendering of a detail view of the GMP vehicle of FIG. 5.

FIG. 7 is a rendering of a detail view of the GMP vehicle of FIG. 5.

Figure 8:
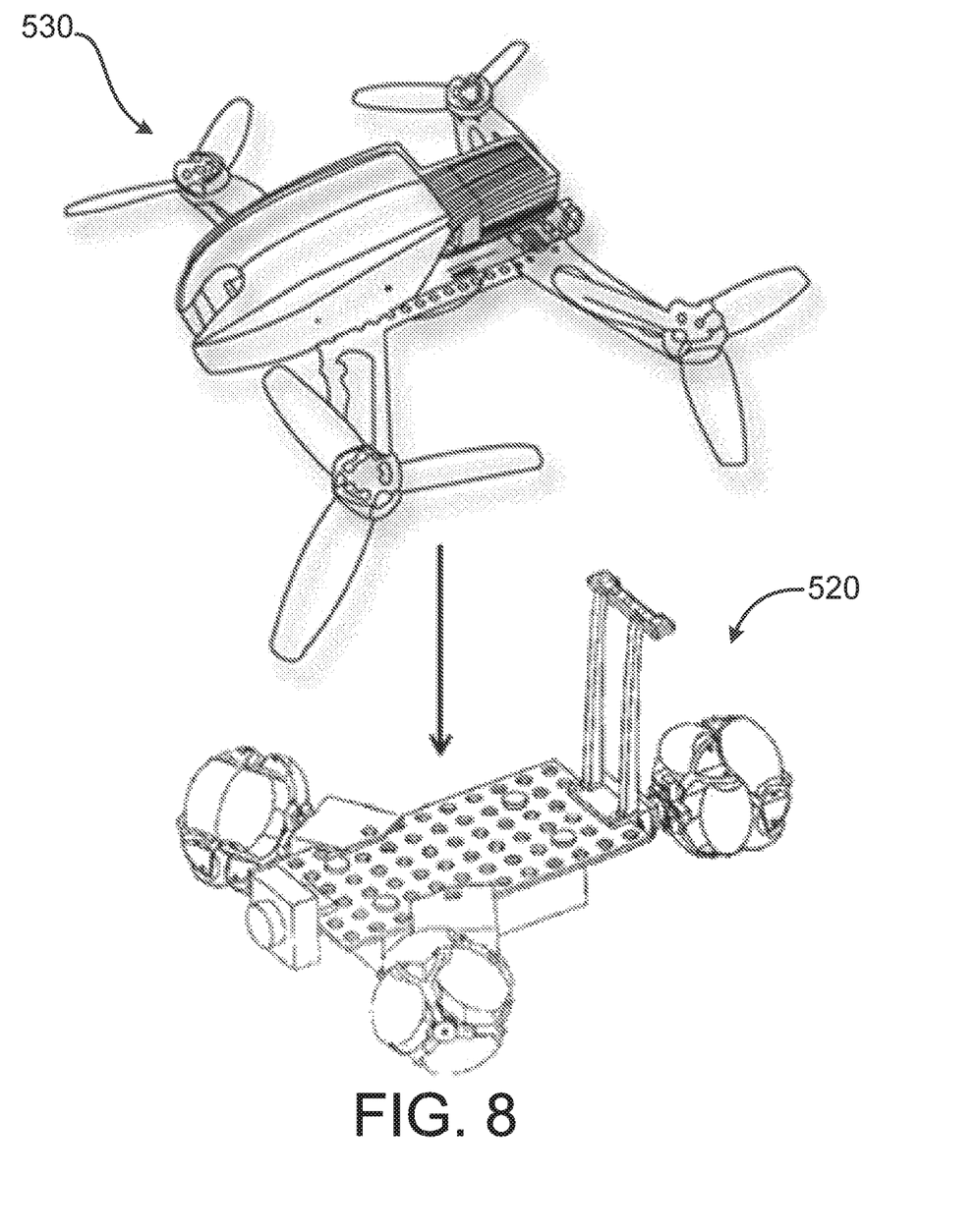
FIG. 8 is a rendering of a UAV hovering above the GMP vehicle of FIG. 5, according to an embodiment.

FIG. 8 is a rendering of a UAV hovering above the GMP vehicle of FIG. 5, according to an embodiment. The UAV 530 is a specific version of the VR Mapper/Wasp that is being positioned on top of the GMP embodiment 520 described above with reference to FIGS. 5-7. The relative proportions of the GMP to the UAV can vary between embodiments.

Figure 9:
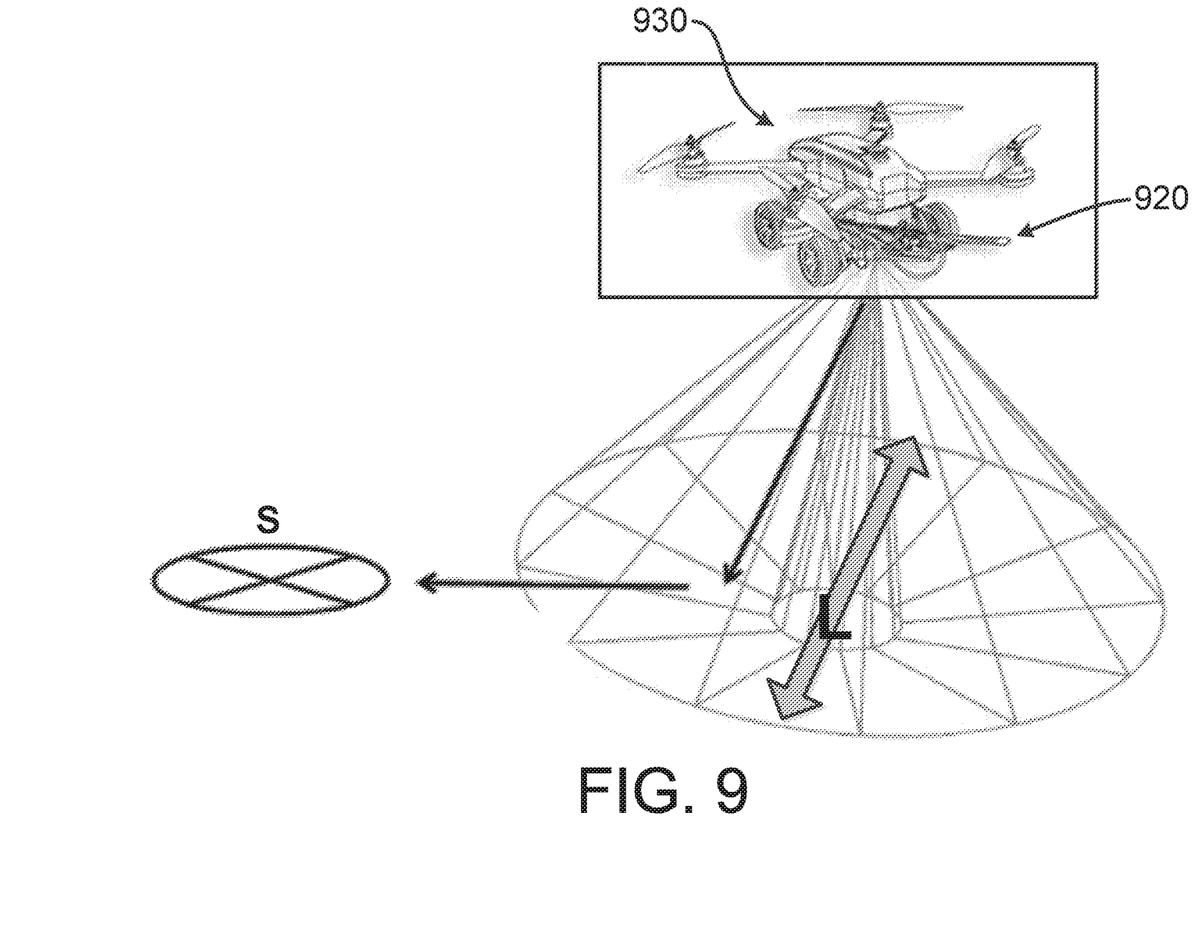
FIG. 9 is a rendering of a UAV with an integrated GMP vehicle, along with an example landing location and lateral location to which the UAV will move after landing.

FIG. 9 is a rendering of a UAV with an integrated GMP vehicle, along with an example landing location and a predetermined location to which the UAV will move after landing. In this example of landing procedure, the UAV 930, with attached GMP 920, can land in any of the region marked "L," with variation depending, for example, on imprecise position data (e.g., GPS data) and/or adverse weather conditions, or any other lack of control. Once the UAV 930/GMP 920 has landed within the region "L," the UAV 930/GMP 920 can move along the ground to the predefined spot "S" through propulsion by the GMP.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An apparatus for providing ground propulsion to an unmanned aerial vehicle (UAV), comprising:
   a frame configured to physically support an unmanned aerial vehicle (UAV) during landing and to selectively mechanically couple with said unmanned aerial vehicle (UAV);
   a plurality of wheels, wherein at least one wheel of said plurality of wheels is actuatable by a motor; and
   a controller operably coupled to said motor so as to control the propulsion of said unmanned aerial vehicle (UAV);
   wherein said controller is adapted to interface with a flight-control system board of said unmanned aerial vehicle (UAV) to receive commands to control the propulsion of said unmanned aerial vehicle (UAV) when the frame is mechanically coupled with said unmanned aerial vehicle (UAV).

2. The apparatus of claim 1, wherein:
   said controller is adapted to interface, in use, with a remote control unit.

3. The apparatus of claim 1, further comprising:
   a charger configured to connect to and recharge a battery of said unmanned aerial vehicle (UAV) during use.

4. The apparatus of claim 3, wherein:
   said charger comprises a wireless charger.

5. The apparatus of claim 1, wherein:
   when said frame is coupled with said unmanned aerial vehicle (UAV), said apparatus is electrically coupled to said unmanned aerial vehicle (UAV).

6. The apparatus of claim 5, wherein:
   when said frame is coupled with said unmanned aerial vehicle (UAV), said apparatus receives electrical power from a power supply of said unmanned aerial vehicle (UAV).

7. The apparatus of claim 1, wherein:
   said frame includes an adapter configured to connect to said unmanned aerial vehicle (UAV) by at least one of mechanical and electrical couplings.

8. The apparatus of claim 7, wherein:
   said adapter is configured to connect to any one of a plurality of unmanned aerial vehicle (UAV) types by the at least one of mechanical and electrical couplings.

9. The apparatus of claim 1, further comprising:
   a battery.

10. The apparatus of claim 1, further comprising:
    at least one of a GPS receiver and an antenna.

11. The apparatus of claim 1, further comprising:
    a gimbal.

12. The apparatus of claim 1, further comprising:
    a sensor to receive positional data,
    wherein the instructions further cause the controller to drive said motor so as to reposition said unmanned aerial vehicle (UAV) based upon said positional data.

13. The apparatus of claim 12, wherein:
    said sensor comprises a sensor selected from the group comprising a GPS receiver, an accelerometer, a gyroscope, a LIDAR device, and a visual recognition system.

14. The apparatus of claim 12, wherein:
    said positional data includes at least one of positional data of the apparatus, and positional data of said UAV.

15. The apparatus of claim 12, wherein:
    said computer further interfaces with a camera configured to capture at least one of video and still images.

16. The apparatus of claim 15, further comprising:
    an image processor for processing said at least one of said video and still images.

17. The apparatus of claim 1, wherein:
    said computer further includes an antenna configured to communicate with a remote terminal.

18. The apparatus of claim 17, wherein:
    said remote terminal is the unmanned aerial vehicle (UAV).

19. The apparatus of claim 17, wherein:
    said remote terminal is a docking and recharging station.

20. A system, comprising:
    an unmanned aerial vehicle (UAV);
    a frame configured to physically support said unmanned aerial vehicle (UAV) during landing and to selectively mechanically couple with said unmanned aerial vehicle (UAV);
    a plurality of wheels, wherein at least one wheel of said plurality of wheels is actuatable by a motor; and
    a controller operably coupled to said motor so as to control ground propulsion of said unmanned aerial vehicle (UAV);
    wherein said controller is adapted to interface with a flight-control system board of said unmanned aerial vehicle (UAV) to receive commands to control ground propulsion of said unmanned aerial vehicle (UAV) when the frame is mechanically coupled with said unmanned aerial vehicle (UAV).

21. A method for providing ground propulsion to an unmanned aerial vehicle (UAV), comprising the steps of:
    selectively coupling an unmanned aerial vehicle (UAV) to a ground propulsion apparatus, wherein said propulsion apparatus comprises a frame configured to physically support said unmanned aerial vehicle (UAV) during landing and to be mechanically coupled to said unmanned aerial vehicle (UAV), a plurality of wheels, wherein at least one wheel of said plurality of wheels is actuatable by a motor, and a controller operably coupled to said motor so as to control the propulsion of said unmanned aerial vehicle (UAV); and interfacing said controller with a flight-control system board of said unmanned aerial vehicle (UAV) to receive commands to control the propulsion of said unmanned aerial vehicle (UAV) when the frame is mechanically coupled with said unmanned aerial vehicle (UAV).

* * * * *